UNITED STATES PATENT OFFICE.

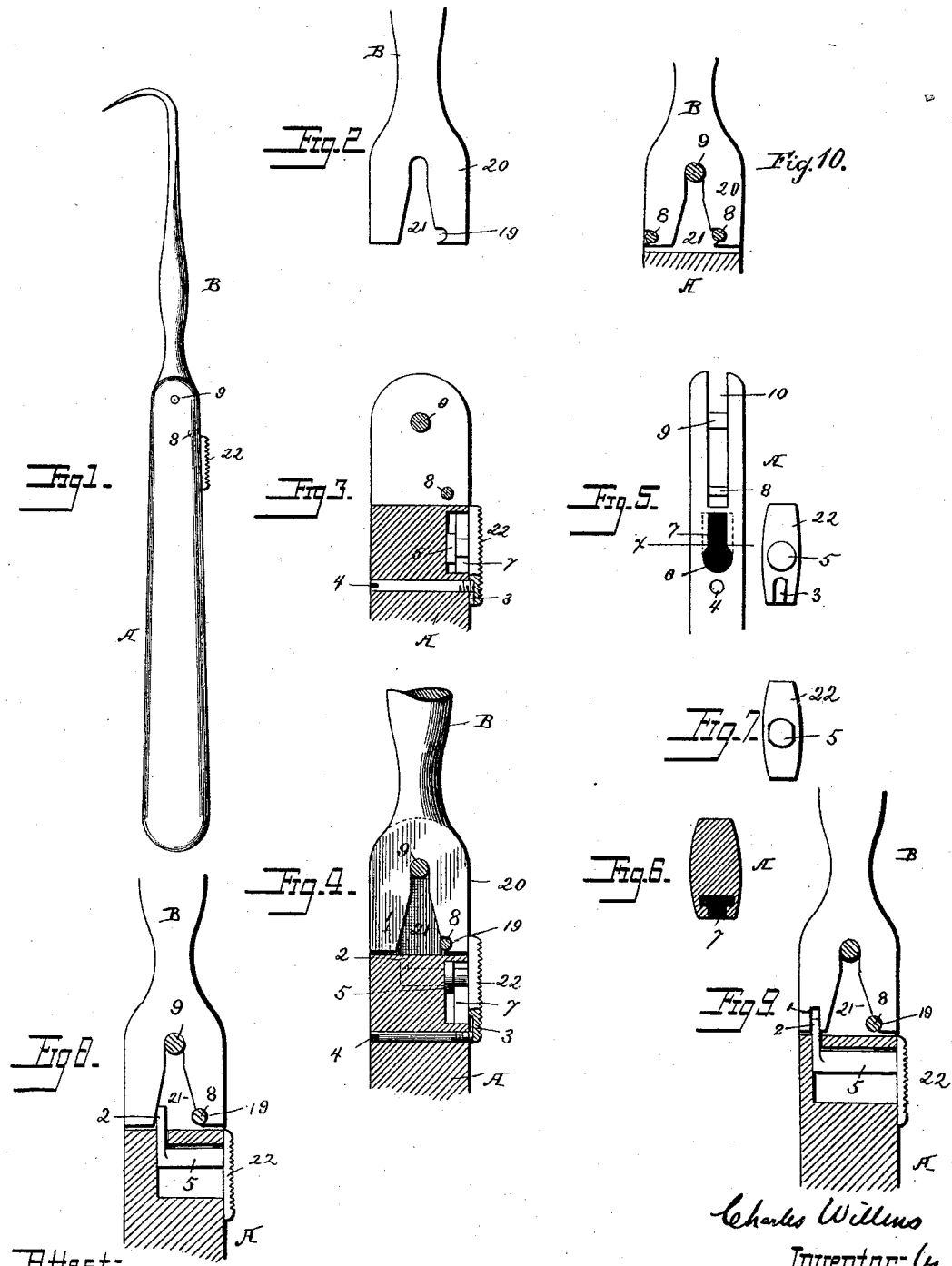

CHARLES WILLMS, OF BALTIMORE, MARYLAND.

TOOL-HANDLE.

SPECIFICATION forming part of Letters Patent No. 370,913, dated October 4, 1887.

Application filed June 27, 1887. Serial No. 242,666. (No model.)

*To all whom it may concern:*

Be it known that I, CHARLES WILLMS, a citizen of the United States, residing at the city of Baltimore, and in the State of Maryland, have invented certain new and useful Improvements in Implement and Tool Handles, fully set forth in the following specification and represented in the accompanying drawings.

This invention relates, generally, to implement and tool holders, and particularly to that class wherein the holder is provided with means for securing an implement to a grasping-piece in such manner that it may be readily removed and replaced by another implement similarly adapted to said grasping-piece.

The present device is an improvement over those heretofore employed; and it consists, essentially, of a holder or grasping-piece provided with two fixed supporting and retaining studs or pins and a securing-slide adapted, in conjunction with said studs, to securely support the implement and its shank in position for use, the said shank of the implement being provided with a bifurcated end for straddling one of the studs and a hook for engaging with the other. A more ready understanding thereof will be best had from a detailed description of the accompanying drawings, in which—

Figure 1 is a side elevation of a holder or grasping-piece provided with the present invention and supporting an implement. Fig. 2 is an enlarged elevation of the shank of an implement adapted to be secured to the holder. Fig. 3 is an enlarged vertical section taken through the jointed end of the holder, showing the location of the supporting and retaining studs and the securing-slide. Fig. 4 is a similar section showing the shank of an implement secured in position. Fig. 5 is an end elevation of the holder or grasping-piece with the securing-slide removed. Fig. 6 is a cross-section of the same taken on the line $xx$. Fig. 7 is a rear view of a modification of the slide and its stud; and Figs. 8 and 9 are views similar to Fig. 4, showing modified forms of the means for retaining the shank of the tool in its position in the handle. Fig. 10 is also a modification, hereinafter referred to.

Referring to said drawings, it is to be understood that A represents the handle or grasping piece, and B the implement or tool adapted to be secured thereto.

The handle A may be of any desired shape suited to the requirements of the use of the implement. At its jointed end it is provided with an open slot, 10, Fig. 5, of such dimensions and extending a distance into the handle, so as to properly receive the shank 20 of the implement. This end of the handle is provided with two studs, 9 8, extending between the walls of the slot 10 in such position that when the handle and shank are assembled the latter will be firmly supported and secured thereto. The studs employed are preferably formed from round wire, so that no other manipulation thereof is necessary other than in securing them in position. The handle is also provided with a slide, 22, hereinafter more fully described, that is adapted to be extended over the end of the shank end and prevent it when in place from being disengaged from one of said studs and allow it to be withdrawn from said end of the shank when it is desired to remove the implement; and so far as the essential features of the invention are concerned it may obviously consist of a ring surrounding the handle and any other device performing the functions thereof.

The shank 20 of the implement is provided with the bifurcated end 21, and is thus adapted to straddle the stud 9, as in Fig. 4, and, while it is not necessary to do so, will preferably bear thereon, as shown. The walls of the bifurcation should, to secure a good fit and steadiness of the implement, fit the stud snugly. One of the legs of the bifurcation is provided with a hook, 19, that is adapted to engage with the stud 8 in such manner as to resist a movement to pull the implement and handle apart.

From the foregoing description it will be understood that the shank of the implement is secured in its place in the handle by simply inserting it into the slotted end of the handle, so that its bifurcated end 21 straddles the stud 9, and the hook 19 on one end of the bifurcation engages the other stud 8, when the slide 22 is moved from the position shown in Fig. 3, so that its end overlies the end of the bifurcation, and thus tends to securely hold the hook in engagement with the stud 8, as in Fig. 4. The removal of the implement from the handle of course will be effected by a reverse movement of the slide 22 and by a slight oscillation of the shank to release the hook 19 from engagement with the stud 8.

The means for securing the retaining-slide 22 to the handle, so as to permit it to have the requisite movement hereinbefore set forth, consists in providing the handle with a T-shaped groove, 7, (see Figs. 5 and 6,) having an opening, 6, the width of the T at one end to receive the head of a T-shaped stud, 5, extending from the side of the slide 22, Fig. 4. In order to prevent said slide when in use from moving until its stud 5 and the opening 6 correspond, I insert a stop-pin, 4, entered from the opposite side of the handle, which enters a longitudinal recess, 3, formed in the inner face of the slide 22, the shoulder formed by the end of the recess forming a stop, effectually preventing the further movment of the slide in one direction and preventing its stud 5 from reaching the opening 6, and the position of the slide, contacting with the shank of the tool, will be secured by tightness of the fitting of the parts or by friction between the contacting portions of the slide and shank.

While the longitudinal recess 3 is not necessary for the purpose of limiting the movement of the slide, it is preferably employed, as it also acts in conjunction with the stop-pin as a guide for properly directing the movements of the slide and preventing it from becoming twisted out of alignment. This latter result, however, may be effected by flattening the opposite sides of the head of the stud 5, as is seen in Fig. 7.

It is obvious that the means for retaining the hook 19 in engagement with the stud 8, instead of bearing against the outer side of the hook, as shown, might bear against the inner side of the bifurcation by a projection, 2, as shown in Fig. 8. So, too, such means might engage with a notch, as 1, also shown in Fig. 9.

The hook 19 and stud 8 may be duplicated—that is to say, the other leg of the bifurcation may be provided with a hook engaging with a similar stud, as 8, in Fig. 10.

What I claim is—

1. The herein-described article of manufacture, consisting of a shank of an implement having a bifurcated end and a hook formed on one of the legs of the bifurcated end, and a handle having two studs, one straddled by the bifurcation of said shank and the other engaged by the hook, and a slide for retaining the hook and stud in engagement, substantially as described.

2. The combination, with the shank of an implement having the bifurcated end 21 and hook 19 on one leg of the bifurcated end, of a handle provided with studs 9 and 8, and a retaining-slide, substantially as described.

3. The combination, with the shank of an implement having the bifurcated end 21 and hook 19 on the leg of the bifurcated end, of a handle provided with studs 9 and 8, and a retaining-slide extending over and against the hook end of the bifurcation to keep it and the stud 8 in engagement, substantially as described.

4. In a handle for holding implements, the combination, with a handle provided with the slot 7, and retaining-slide 22, having a stud engaging with said slot, of a stop-pin, 4, substantially as described.

5. In a handle for holding implements, the combination, with a handle provided with the slot 7, retaining-slide 22, having a stud engaging with said slot, of the longitudinal recess 3, and stop-pin 4, substantially as and for the purpose set forth.

In testimony whereof I have signed my name to this specification in the presence of two subscribing witnesses.

CHARLES WILLMS.

Witnesses:
THOS. KELL BRADFORD,
A. W. BRADFORD, Jr.